(12) United States Patent
Umeda

(10) Patent No.: US 8,582,130 B2
(45) Date of Patent: Nov. 12, 2013

(54) IMAGE PROCESSING APPARATUS, IMAGE PROCESSING METHOD, AND STORAGE MEDIUM

(75) Inventor: Yoshinobu Umeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 406 days.

(21) Appl. No.: 13/084,878

(22) Filed: Apr. 12, 2011

(65) Prior Publication Data

US 2011/0255117 A1   Oct. 20, 2011

(30) Foreign Application Priority Data

Apr. 15, 2010 (JP) ................. 2010-094080

(51) Int. Cl.
- *G06K 9/36* (2006.01)
- *G06K 15/00* (2006.01)
- *G06F 11/00* (2006.01)
- *G06F 3/12* (2006.01)

(52) U.S. Cl.
USPC ....... 358/1.13; 358/1.15; 358/1.18; 358/1.17; 382/232; 714/25; 714/35; 714/381.3

(58) Field of Classification Search
USPC .............. 358/1.15, 1.18, 1.13, 1.17; 382/232; 714/25, 35, 381.3
See application file for complete search history.

(56) References Cited

U.S. PATENT DOCUMENTS

| | | | |
|---|---|---|---|
| 6,609,216 B1 * | 8/2003 | Almy et al. | 714/25 |
| 7,447,992 B2 * | 11/2008 | Kawabata | 715/243 |
| 7,630,097 B2 * | 12/2009 | Kodama et al. | 358/1.18 |
| 7,802,243 B1 * | 9/2010 | Feeser et al. | 717/169 |
| 8,149,427 B2 * | 4/2012 | Inoue et al. | 358/1.13 |
| 2004/0047510 A1 * | 3/2004 | Kawabata | 382/232 |
| 2010/0110493 A1 * | 5/2010 | Kato | 358/1.15 |

FOREIGN PATENT DOCUMENTS

| | | | |
|---|---|---|---|
| JP | 2007-108924 A | | 4/2007 |
| JP | 2009-116752 A | | 5/2009 |

* cited by examiner

*Primary Examiner* — Akwasi M Sarpong

(74) *Attorney, Agent, or Firm* — Canon USA Inc. IP Division

(57) ABSTRACT

An image processing apparatus includes a microprocessor unit which acquires information about the attribute of a print job from the received print job, determines which method is suitable as a printing method for the print job, performs a first printing method in which a print process is started before a raster image processing (RIP) process on all pages included in the print job is ended or a second printing method in which a print process is started after the RIP process on all pages included in the print job is ended, based on the attribute information, and decides the printing method determined as suitable for the print job as the printing method to be executed on the print job.

13 Claims, 5 Drawing Sheets

IMAGE PROCESSING APPARATUS, IMAGE PROCESSING METHOD, AND STORAGE MEDIUM

BACKGROUND OF THE INVENTION

1. Field of the Invention

The present invention generally relates to image processing and, more particularly, to an image processing apparatus and an image processing method in which image data generated by subjecting page description language (PDL) data to raster image processing (RIP) is printed on a recording paper, and a storage medium.

2. Description of the Related Art

An image forming apparatus rasterizes data described by page description language (hereinafter referred to as PDL) into a bitmap image (raster image) and prints based on the raster image and prints based on the raster image. A process for rasterizing the PDL data into the raster image is referred to as rasterization or raster image processing, abbreviated to RIP.

In a case where the image forming apparatus subjects the PDL data to the RIP process to print, while the image forming apparatus is printing on page "m," the image forming apparatus performs the RIP process of page "m+1" in parallel. As described above, the method of performing the RIP process in parallel with printing is referred to as "RIP While Print." The image forming apparatus uses the RIP While Print to allow reducing time necessary for printing after receiving the PDL data.

On the other hand, if a condition is different in fixing pigment to recording paper to form an image thereon, a problem occurs that a predetermined color is not represented on the recording paper. For example, in an electrophotographic image forming apparatus, a change in temperature of a fixing heater in fixing a toner to the recording paper changes a tint on the recording paper.

For that reason, if a high image quality is needed for a print result, a recording paper is caused to pass through the fixing heater during printing at regular intervals, the temperature of the fixing heater is controlled while the recording paper is passing, and the temperature of the fixing heater needs to be kept constant in fixing the toner to the recording paper.

If it takes a lot of time to perform the RIP process on a page, the following page cannot be printed at an assumed interval, which changes the temperature of the fixing heater. This causes time (cycle down time) during which printing cannot be performed until the temperature of the fixing heater is restored again to the previous temperature.

To solve this problem, an image forming apparatus being high in image quality has adopted a method in which the PDL data on all pages are subjected to the RIP process before printing is performed uniformly instead of performing the RIP process in parallel with printing, and thereafter printing is performed. The above method of performing printing after the RIP is referred to as "RIP Then Print." Since the method of "RIP Then Print", however, does not perform printing until the rasterization of all pages is ended, the method of "RIP Then Print" can take longer time to output a print result than that of "RIP While Print."

The following technique is known as the one for reducing time consuming until a print result is output. Japanese Patent Application Laid-Open No. 2009-116752 discusses a technique in which information about the PDL is received in advance and a corresponding interpreter is developed to a memory, thereby reducing time for developing the interpreter corresponding to the PDL to be sent to the memory.

Japanese Patent Application Laid-Open No. 2007-108924 discusses a technique in which, if an image transmission source is low in processing capacity of terminal information, the RIP process is started after the transmission of data and, if the image transmission source is high in the processing capacity, the RIP process is started while data are being transmitted.

In the techniques of the above patent documents, the time consumed until the printing is ended is reduced by advancing the timing at which the RIP process is started, and both techniques use the method of "RIP Then Print." For that reason, the printing in the method of "RIP Then Print" is never performed until rasterization on all pages is ended to take a longer time than the printing in the method of "RIP While Print." In the conventional techniques, either of "RIP While Print" or "RIP Then Print" is selected, so that there is a problem in which it takes much time to output print result depending on setting of print job or print environment.

SUMMARY OF THE INVENTION

According to an aspect of the present invention, an image processing apparatus includes an acquisition unit configured to acquire information about an attribute of a print job from the print job received, a determination unit configured to determine which method is suitable as a printing method for the print job, a first printing method in which a print process is started before an RIP process on all pages included in the print job is ended or a second printing method in which a print process is started after the RIP process on all pages included in the print job is ended, based on the attribute information acquired by the acquisition unit, and a decision unit configured to decide the printing method determined as suitable for the print job by the determination unit as the printing method executed on the print job, wherein the determination unit determines the first printing method as suitable for the print job if bookbinding print is not set in the print job and a type of PDL included in the print job is not a type of PDL using process time longer than a predetermined process time at a time of the RIP process and determines the second printing method as suitable for the print job if bookbinding print is set in the print job or the type of PDL included in the print job is a type of PDL using process time longer than a predetermined process time at the time of the RIP process.

According to the present invention, "RIP While Print" and "RIP Then Print" are appropriately switched therebetween to allow providing an image forming apparatus capable of reducing time consumed until a print result is output.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
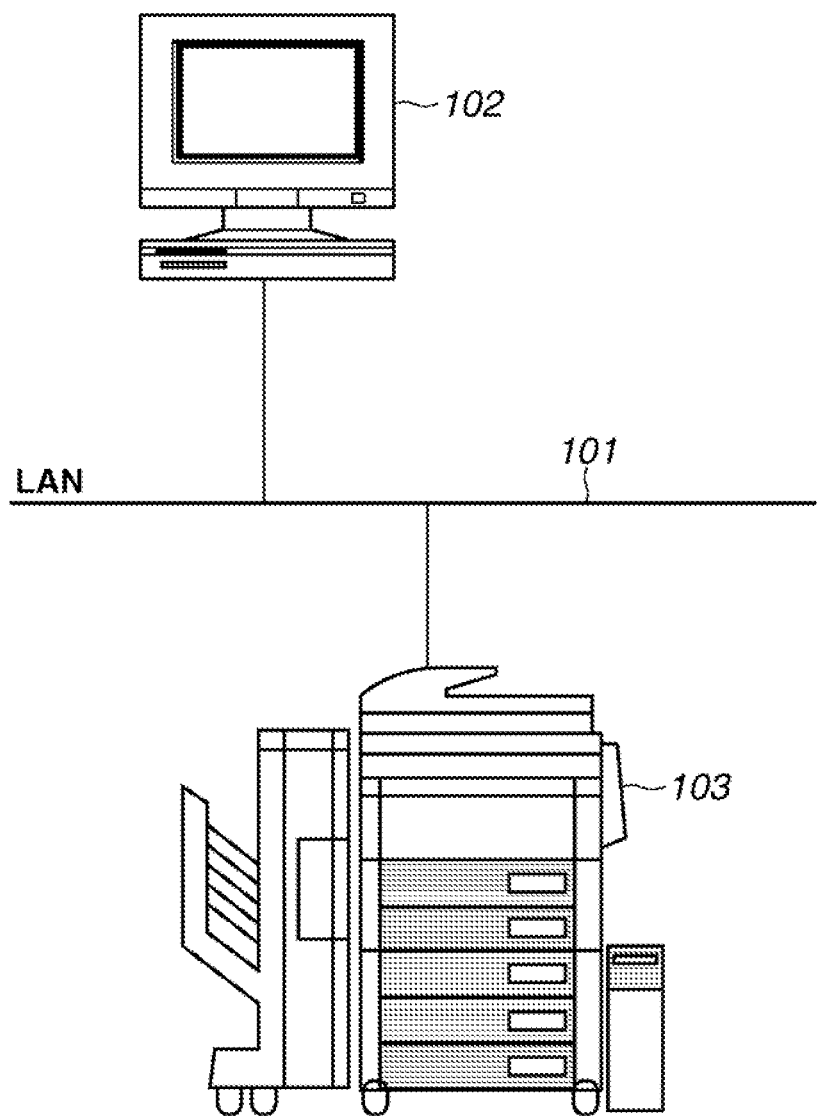
FIG. 1 is a schematic diagram illustrating a configuration of a printing system according to an exemplary embodiment of the present invention.

FIG. 1 is a schematic diagram illustrating a configuration of a printing system according to an exemplary embodiment of the present invention. In FIG. 1, a local area network (LAN) 101 connects a computer 102 to a multifunction peripheral (MFP) 103, which are described below. The computer 102 is used as an information processing apparatus in the present exemplary embodiment. The computer 102 generates and edits image data according to user's instructions. The computer 102 is connected to the LAN 101 and capable of transmitting the generated image data to the MFP 103 as a print job via the LAN 101.

The MFP 103 is used as an image forming apparatus in the present exemplary embodiment. The MFP 103 is also connected to the LAN 101 as is the case with the computer 102. The MFP 103 receives the print job transmitted via the LAN 101, stores it in a storage apparatus of the MFP, and performs a raster image processing (RIP) process and printing of image data.

Although a single computer 102 and MFP 103 are included in the printing system for the sake of simplicity in FIG. 1, a plurality of the computers and the MFPs are usually connected with one another via the LAN 101. The computer 102 selects a desired MFP from among a plurality of the MFPs connected to the LAN 101 and outputs image data thereto. The selected MFP performs the RIP process and printing of the transmitted image data.

Figure 2:
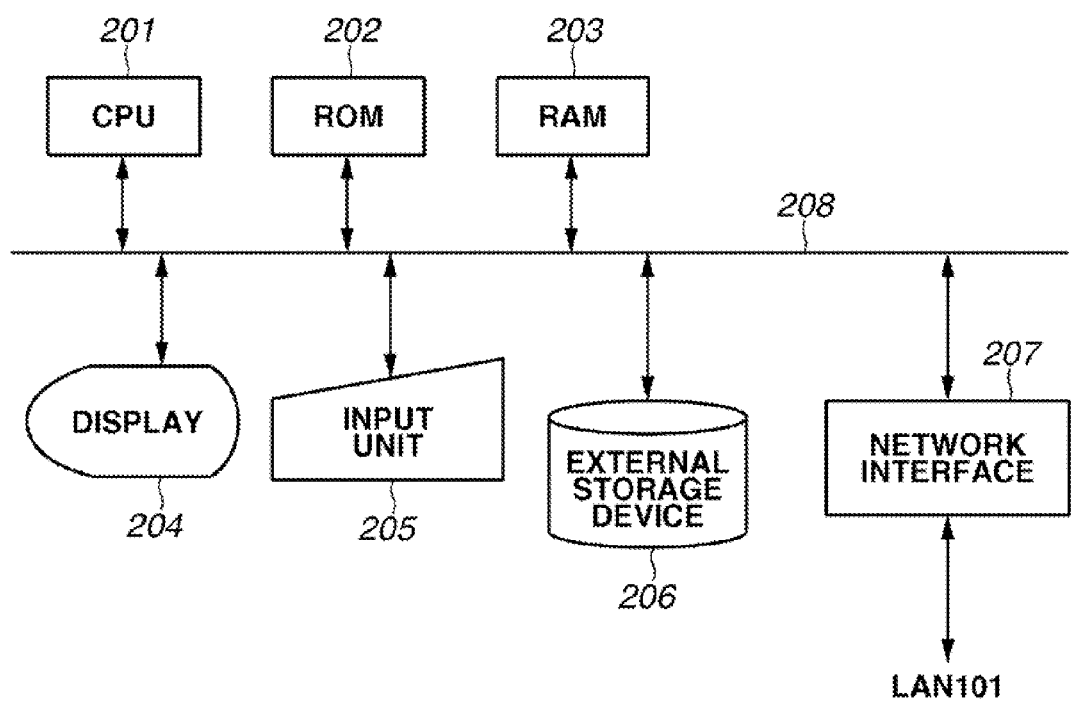
FIG. 2 is a block diagram illustrating an internal structure of a computer according to an exemplary embodiment of the present invention.

FIG. 2 is a block diagram illustrating the internal structure of the computer 102. In FIG. 2, a central processing unit (CPU) 201 controls the entire computer 102. A read-only memory (ROM) 202 stores various control programs to be executed by the CPU 201.

A random access memory (RAM) 203 loads the control programs and application programs stored in the ROM 202 and an external storage device 206 and stores therein. The CPU 201 executes processing using the programs loaded on the RAM 203. The RAM 203 provides a work area used by the CPU 201 for executing various controls.

A display 204 performs various displays according to the control of the CPU 201. An input unit 205 performs inputs to the computer 102 through a keyboard or a pointing device. The external storage device 206 stores various application programs and data.

A network interface 207 performs data communication with other apparatuses connected to the network. The LAN 101 in FIG. 1 is connected to the network interface 207, and the computer 102 is connected to the LAN 101 via the network interface 207.

The CPU 201, the ROM 202, the RAM 203, the display 204, an input/output input 205, the external storage device 206, and the network interface 207 are connected to one another via an internal bus 208 in the computer 102.

Figure 3:
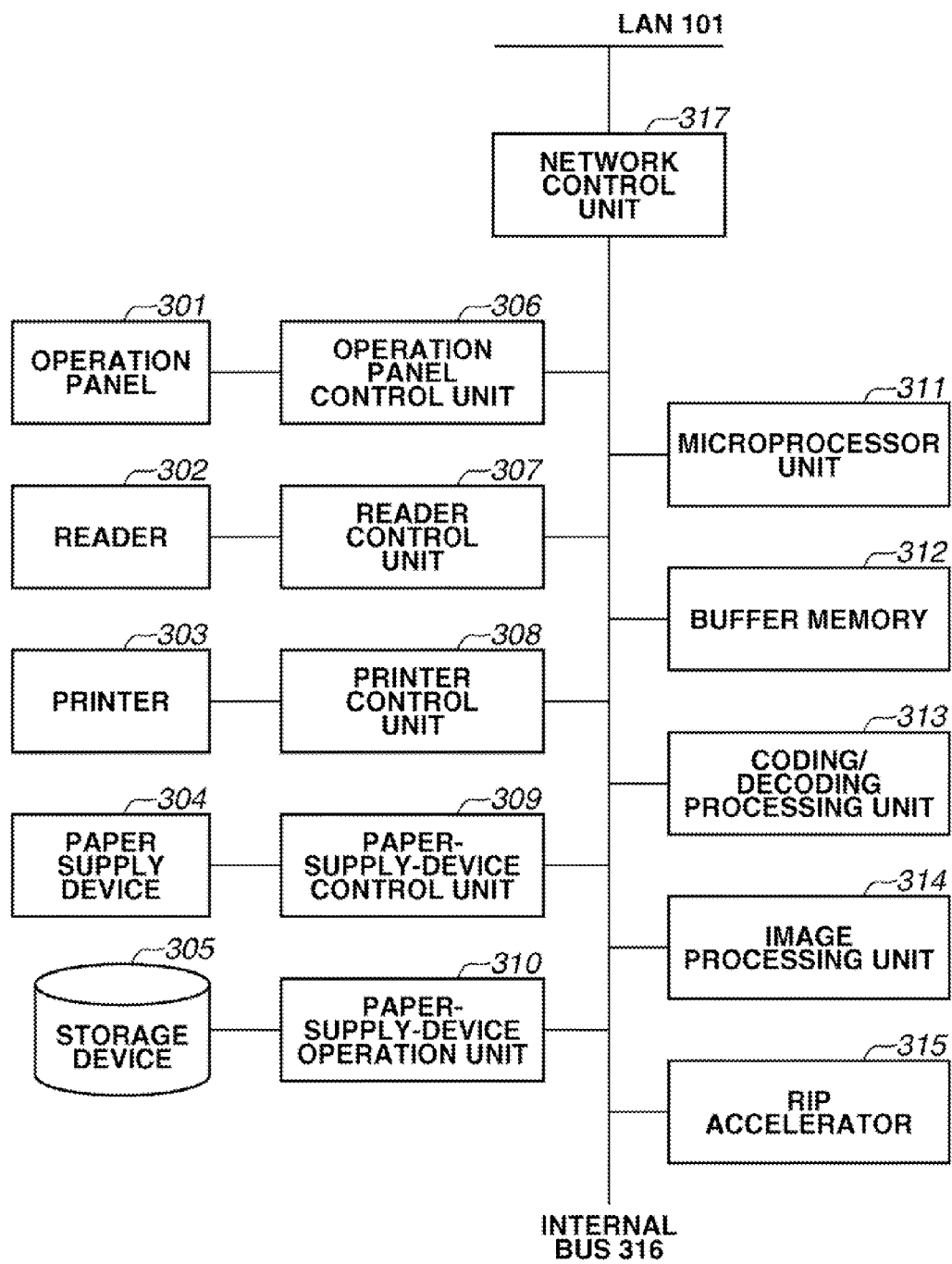
FIG. 3 is a block diagram illustrating an internal structure of an image forming apparatus according to an exemplary embodiment of the present invention.

FIG. 3 is a block diagram illustrating the internal structure of the MFP 103. In FIG. 3, an operation panel unit 301 is the one on which a switch and a display screen operated by the user are arranged, and by which operations such as copy and facsimile transmission are instructed and scaling magnification and telephone number of transmission destination are set.

A reader 302 photo-electrically scans a document to be transmitted to form an image signal. The reader 302 reads a document placed on a document positioning plate by moving photoelectric elements such as charge coupled devices (CCDs) aligned along the main scanning direction to the direction perpendicular to the direction at which the elements are aligned (sub-scanning direction), and generates electric image data. The image data generated by the reader 302 is stored in a buffer memory 312 via a reader control unit 307.

A printer 303 forms the image data generated by the reader 302 and image data sent via a LAN 101 on a recording paper. The electrophotographic printer 303 is connected to the MFP 103 according to the present exemplary embodiment. The image data stored in the buffer memory 312 are transmitted to the printer 303 via a printer control unit 308.

A paper supply device 304 supplies recording paper on which the printer 303 prints image data. The paper supply device 304 supplies the printer 303 with the recording paper designated by the user through the operation panel 301 or designated by the print setting of the print job by the control of a paper-supply-device control unit 309 among the recoding paper stored in the paper supply device 304.

A storage device 305 stores the image data generated by the reader 302 and image data sent via the LAN 101, and is composed of a nonvolatile memory such as a hard disk. An operation panel control unit 306 controls the operation panel 301 and analyzes instructions input by the user via the operation panel 301 to send the contents thereof to a microprocessor unit 311, which is described below.

The reader control unit 307 controls the reader 302, drives the reader 302 according to the instructions of the microprocessor unit 311, causes the reader 302 to read a document on the document positioning plate, and stores the generated image data in the buffer memory 312. The printer control unit 308 controls the printer 303, acquires image data from the buffer memory 312 according to instructions from the microprocessor unit 311, and outputs the image data to the printer 303. The printer control unit 308 drives the printer 303 in synchronization with the output of the image data to print and output images on the recording paper.

The paper-supply-device control unit 309 acquires information such as the size of the recording paper, the existence or absence of the recording paper, and the number of pieces of residual recording paper stored in the paper supply device 304, and sends the information to the microprocessor unit 311. The paper-supply-device control unit 309 controls the paper supply device 304 so that the recording paper designated by the user through the operation panel 301 or designated by the print setting of the print job is supplied to the printer 303 according to the instructions of the microprocessor unit 311.

A storage-device control unit 310 controls the storage device 305, stores data from the buffer memory 312 in the storage-device 305, and outputs data from the storage device 305 to the buffer memory 312 according to the instructions of the microprocessor unit 311.

The microprocessor unit 311 controls the operation of the entire MFP 103 and issues instructions to each unit to execute operations such as scan, printing, and storage of data in the MFP 103. The microprocessor unit 311 includes a ROM for storing control programs for controlling the operation of the MFP 103, a RAM for temporarily storing data for control, and a CPU for executing programs.

The buffer memory 312 temporarily stores image data therein when a document is read by the reader 302, image data is read from the storage device 305, and image data is acquired via the LAN 101. The image data is output from the buffer memory 312 when the image data is printed by the printer 303, the image data is stored in the storage device 305, or the image data is output via the LAN 101.

Page description language (PDL) data included in a print job sent from the computer 102 via the LAN 101 is temporarily stored in the buffer memory 312 and subjected to the RIP process by the microprocessor unit 311. The image data subjected to the RIP process are rasterized into the buffer memory 312, and sent to the printer 303 via the printer control unit 308 to be printed therein.

A coding/decoding processing unit 313 codes the image data stored in the buffer memory 312 if needed (compression process) or decodes the compressed image data (decompression process). An image processing unit 314 performs image processing instructed by the user via the operation panel 301 or processing for improving image quality.

An RIP accelerator 315 performs the RIP process normally performed by the microprocessor unit 311 instead thereof. The RIP accelerator 315 is specialized to the RIP process, and can perform the RIP process faster than the microprocessor unit 311.

The RIP accelerator 315 performing the RIP process instead of the microprocessor unit 311 allows the RIP process to be performed at a high speed and the load of the microprocessor unit 311 to be reduced, improving the processing capacity of the entire image forming apparatus. In the present exemplary embodiment, the RIP accelerator 315 subjects the PDL data stored in the buffer memory 312 to the RIP process, and the rasterized raster image after the RIP process is stored in the buffer memory 312.

If the "RIP Then Print" is used as a printing method, the RIP accelerator 315 performs the RIP process of all PDL data included in one print job stored in the buffer memory 312, and then the printer 303 performs printing. On the other hand, if the "RIP While Print" is used as a printing method, the printer 303 performs printing when the RIP accelerator 315 performs the RIP process of one-page PDL data stored in the buffer memory 312.

At this point, the RIP process on the following page is performed at the same time as one-page raster image is output from the buffer memory 312 to the printer 303. The RIP process of the RIP accelerator 315 and the print process of the printer 303 are performed in parallel. In FIG. 3, although the RIP accelerator 315 performs rasterization, not all MFPs are equipped with the RIP accelerator. If the MFP is not equipped with the RIP accelerator, the process performed by the above RIP accelerator is performed by the microprocessor unit 311 instead.

An internal bus 316 connects the above blocks to one another. Image data, and commands and setting values for operating each block are transmitted and received via the internal bus 316. A network control unit 317 is a unit through which the internal bus 316 is connected to the LAN 101.

The network control unit 317 performs protocol conversion between the LAN 101 and the internal bus 316. For this reason, the image data or the PDL data input via the LAN 101 can be stored in the buffer memory 312, printed by the printer 303, or stored in the storage device 305 as is the case with the image data read from the reader 302. In a case where the PDL data is printed, however, the RIP process needs to be performed by the RIP accelerator 315 or the microprocessor unit 311.

Figure 5:
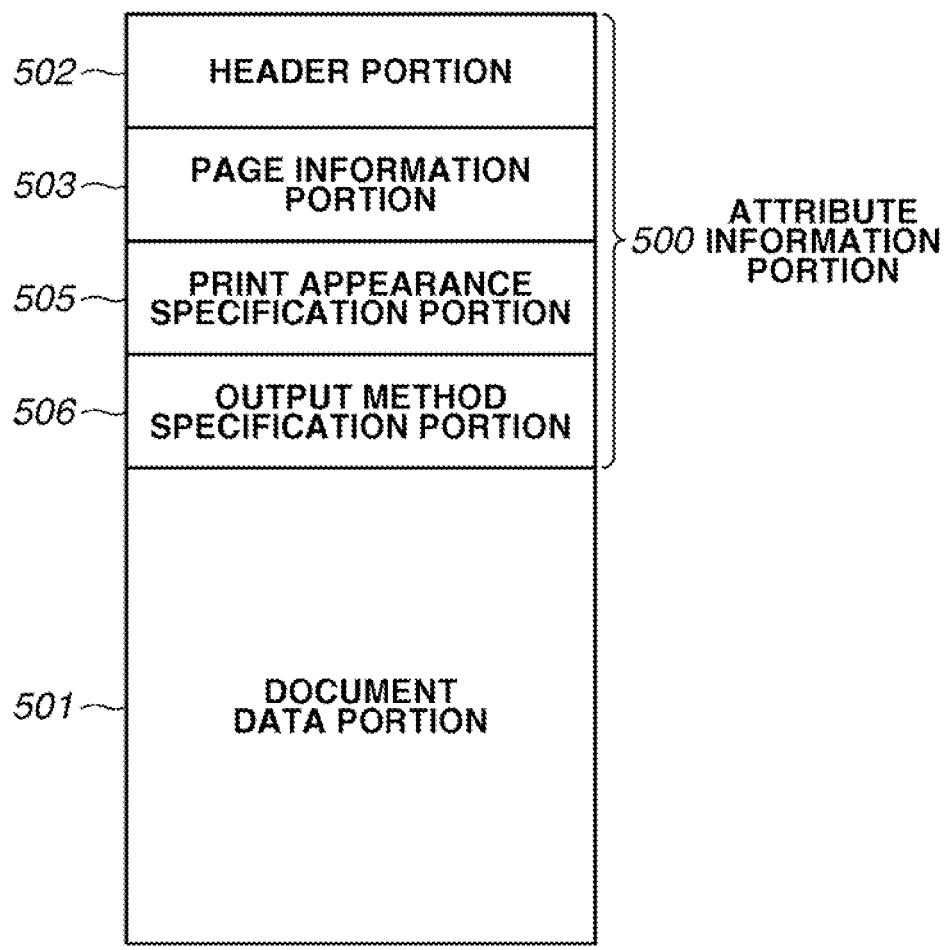
FIG. 5 is a diagram illustrating an example configuration of a print job according to an exemplary embodiment of the present invention.

FIG. 5 is a diagram illustrating an example configuration of a print job sent from the computer 102 to the MFP 103 according to the present exemplary embodiment. As illustrated in FIG. 5, the print job used in the present exemplary embodiment is formed of an attribute information portion 500 and a document data portion 501.

The attribute information portion 500 is a portion where information about a document and instructions for print are described. The document data portion 501 is a portion where data of a document in application are converted into data in a universal format, and the PDL data described by the PDL are included.

The attribute information portion 500 is described further in detail below. The attribute information portion 500 includes a header portion 502, a page information portion 503, a print appearance specification portion 505, and an output method specification portion 506. The header portion 502 stores information indicating the version of the print job and the type of the PDL of the PDL data included in the document data portion 501.

The page information portion 503 stores information about each page of a document such as the number of pages of the document stored in the document data portion 501, the size of each page, and monochrome or color print.

The print appearance specification portion 505 stores information for specifying print appearance in printing a document. The information used for specifying print appearance includes, for example, the range of a page to be printed, the number of copies, printing order, information about the imposition of document data (i.e., information about N-UP or bookbinding print and page arrangement), instructions for stapling and punching, and the designation of recording paper for print. The information stored in the print appearance specification portion 505 is described in detail below.

[Information about Bookbinding Print]

Information about bookbinding print includes information about whether to perform bookbinding print in printing a document stored in the document data portion 501 and information about the type of bookbinding print (such as dual page print binding, side stitching, or saddle stitching) in a case where the bookbinding print is performed.

[Information about Page Arrangement of PDL Data]

Information about the page arrangement of PDL data indicates whether the document stored in the document data portion 501 is stored in the printing order in conformity with the bookbinding print in a case where the bookbinding print is performed. If the document is not stored in the printing order in nonconformity with the bookbinding print, the printing order is to be changed before printing in conformity with the page order after the bookbinding print in MFP 103.

[The Number of Prints and Printing Order]

The number of prints indicates the number of prints of the document stored in the document data portion 501. The printing order indicates whether printing is performed in units of pages (i.e., the same page is repetitively printed for a predetermined number of times and then the following page is printed) or in units of copies in a case where a plurality of copies of the document stored in the document data portion 501 is printed.

[Designation of Recording Paper]

The designation of recording paper is information for designating recording paper on which a document is printed.

The output method specification portion 506 is a portion where a method of printing a document is specified. The output method specification portion 506 includes information indicating output methods to be executed such as distributed printing, broadcast printing, proxy printing, and normal printing (not proxy printing) and printing methods to be executed. As the information about printing methods to be executed, the output method specification portion 506 stores information indicating that printing is performed by which of printing methods, "RIP While Print" or "RIP Then Print."

Figure 4:
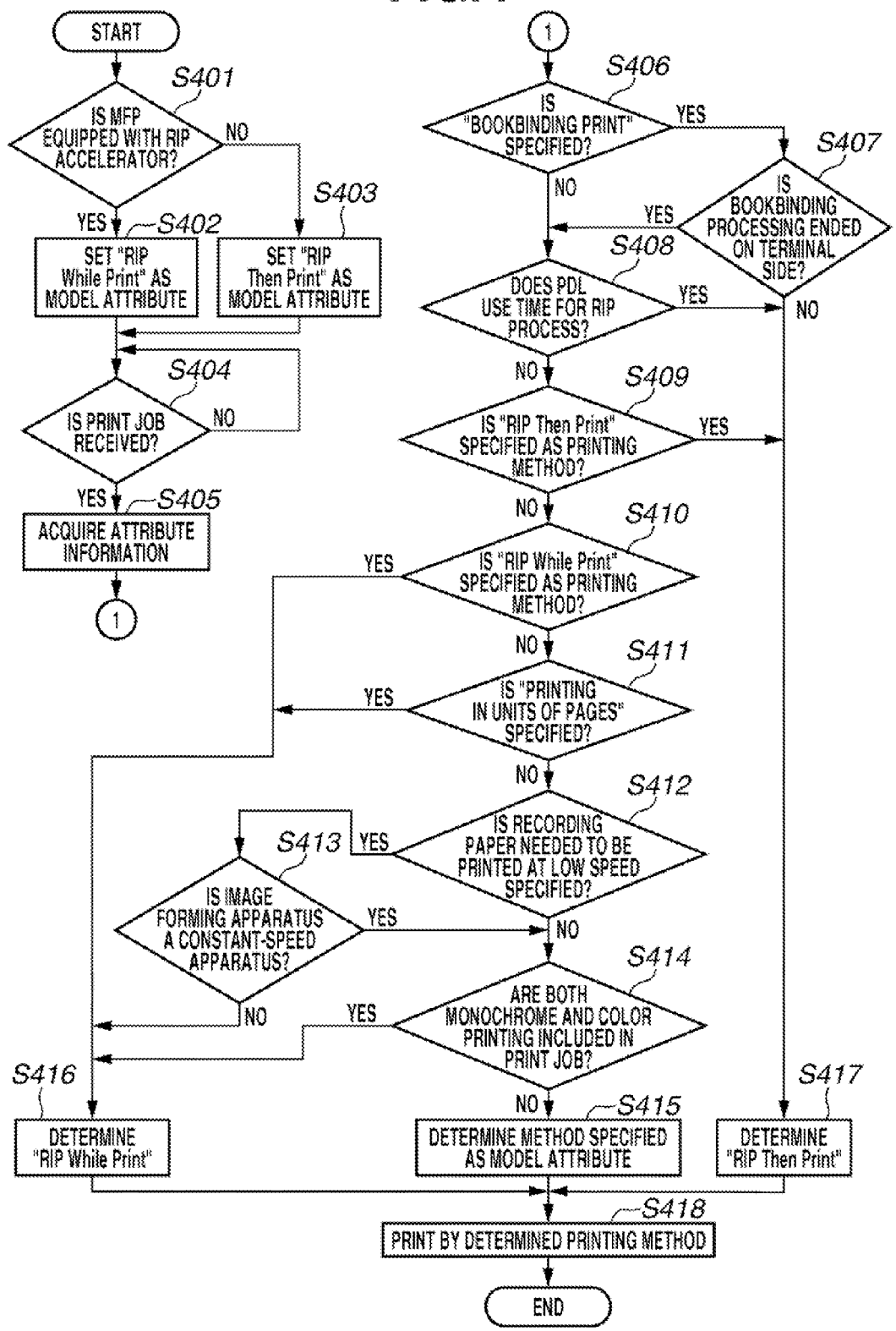
FIG. 4 is a flow chart illustrating an operation of a microprocessor unit 311 according to an exemplary embodiment of the present invention.

As the information to be used in the flow chart in FIG. 4, information about printing method (indicating whether "RIP While Print" or "RIP Then Print" is specified) is stored. In steps S409 and S410 in FIG. 4, the microprocessor unit 311 performs determination with reference to information about the printing method in the output method specification portion 506.

FIG. 4 is a flow chart illustrating an operation of the microprocessor unit 311 in the MFP 103 determining a printing method in sending a print job from the computer 102 to the MFP 103 in the present exemplary embodiment. The flow chart illustrated in FIG. 4 is executed by the CPU of the microprocessor unit 311 executing the control program stored in the ROM to control each component of the MFP 103.

In step S401, the microprocessor unit 311 determines whether the MFP 103 is equipped with the RIP accelerator 315. If the microprocessor unit 311 determines that the MFP 103 is equipped with the RIP accelerator 315 (YES in step S401), the processing proceeds to step S402. If the microprocessor unit 311 determines that the MFP 103 is not equipped with the RIP accelerator 315 (NO in step S401), the processing proceeds to step S403.

In step S402, the microprocessor unit 311 sets "RIP While Print" (first printing method) as the model attribute of the MFP 103. In step S403, the microprocessor unit 311 sets "RIP Then Print" (second printing method) as the model attribute of the MFP 103.

The model attribute refers to a setting automatically selected by the MFP 103 according to instructions via a print job or the operation panel 301 unless otherwise specified. For example, if "RIP While Print" is set as the model attribute, the MFP 103 performs printing by the printing method of "RIP While Print" unless otherwise specified.

In step S404, the microprocessor unit 311 waits a print job to be input from the computer 102 (NO in step S404). After the MFP 103 receives the print job (YES in step S404), in step S405, the microprocessor unit 311 acquires attribute information from among print jobs stored in the buffer memory 312.

The attribute information acquired here refers to the one stored in the attribute information portion 500 of the print job described with reference to FIG. 5. The print job is received by storing the print job in the buffer memory 312 from the LAN 102 via the network control unit 317.

In step S406, the microprocessor unit 311 determines whether the bookbinding print is set in the received print job. If the microprocessor unit 311 determines that the bookbinding print is set (YES in step S406), the processing proceeds to step S407. If the microprocessor unit 311 determines that the bookbinding print is not set (NO in step S406), the processing proceeds to step S408. The microprocessor unit 311 performs determination with reference to information about the bookbinding print included in the print appearance specification portion 505 among the acquired attribute information.

For the bookbinding print, a plurality of pages of different raster images is printed on a piece of recording paper. The bookbinding print has various types of the methods such as dual page print binding, side stitching and the like. If the bookbinding print of saddle stitching, for example, is performed, the printing cannot be started until the RIP process of all pages is finished because the first and last pages are printed on the same recording paper.

For that reason, the RIP process on the page to be printed following the m-th page cannot be finished while the print process on the m-th page included in the print job is being performed. In a case where the bookbinding print is performed, printing needs to be performed by the "RIP Then Print" in which printing is made after the RIP process of all pages is finished. However, the computer 102 can rearrange PDL data in a necessary order of page in consideration of allocation of pages after the bookbinding print is performed (hereinafter this work is referred to as bookbinding work).

If the MFP 103 receives a print job including the PDL data after the bookbinding work, the RIP process on the page to be printed following the m-th page can be finished while the print process on the m-th page included in the print job is being performed. Therefore, printing can be started, in other words, printing can be performed by the "RIP While Print" without the need for waiting the end of the RIP process.

In step S407, the microprocessor unit 311 determines whether the computer 102 being the transmission source of the print job has finished the bookbinding work in the print job performing the bookbinding print. If the microprocessor unit 311 determines that the computer 102 has finished the bookbinding work (YES in step S407), the processing proceeds to step S408. If the microprocessor unit 311 determines that the computer 102 has not finished the bookbinding work (NO in step S407), the processing proceeds to step S417. The microprocessor unit 311 performs determination with reference to information about page arrangement of PDL data included in the print appearance specification portion 505 among the acquired attribute information.

In step S408, the microprocessor unit 311 determines whether the type of the PDL of document data included in the print job is a PDL using much time to perform the RIP process. If the microprocessor unit 311 determines that the type of the PDL is a PDL using much time to perform the RIP process (YES in step S408), the processing proceeds to step S417. If the microprocessor unit 311 determines that the type of the PDL is not a PDL using much time to perform the RIP process (NO in step S408), the processing proceeds to step S409.

The "PDL using much time to perform the RIP process" refers to a PDL which uses a process time longer than a predetermined process time. The storage device 305 of the MFP 103 stores information indicating that which type of a PDL uses much time to perform the RIP process. The microprocessor unit 311 performs determination by comparing the information stored in the storage device 305 and indicating which type of a PDL uses much time to perform the RIP process with the information included in the header portion 502 of a print job.

A raster PDL, for example, is cited as an example of the "PDL using much time to perform the RIP process." If the type of the PDL included in the print job is a PDL using much time to perform the RIP process, the "RIP Then Print" is determined as a printing method in the subsequent process. This determination is made to avoid generating time during which printing cannot be performed until a fixing heater is controlled to a predetermined temperature (cycle down time) because a predetermined print time interval is exceeded while the PDL of one page of a print job is being rasterized.

If it takes much time to perform the RIP process, the RIP process on the page to be printed following the m-th page cannot be finished while the print process on the m-th page included in the print job is being performed.

In step S409, the microprocessor unit 311 determines whether the "RIP Then Print" is specified as a printing method to be executed in the print job. If the microprocessor unit 311 determines that the "RIP Then Print" is specified (YES in step 409), the processing proceeds to step S417. If the microprocessor unit 311 determines that the "RIP Then Print" is not specified (NO in step 409), the processing proceeds to step S410.

In step S410, the microprocessor unit 311 determines whether the "RIP While Print" is specified as a printing method to be executed in the print job. If the microprocessor unit 311 determines that the "RIP While Print" is specified (YES in step 410), the processing proceeds to step S416. If the microprocessor unit 311 determines that the "RIP While Print" is not specified (NO in step 410), the processing proceeds to step S411.

If neither of the printing methods is specified in the print job (NO in step S410), in step S411, the microprocessor unit 311 determines whether a plurality of copies of the document included in the print job is printed in units of pages. If the microprocessor unit 311 determines that a plurality of copies of the document is printed in units of pages (YES in step S411), the processing proceeds to step S416. If the microprocessor unit 311 determines that only one copy is printed and printing is performed in unit of copies (NO in step S411), the processing proceeds to step S412.

The microprocessor unit 311 performs determination with reference to the number of prints and printing order included in the print appearance specification portion 505 in the attribute information acquired by the microprocessor unit 311. In step S411, if the microprocessor unit 311 determines that a plurality of copies of the document is printed in units of pages, the "RIP While Print" is determined as a printing method in the subsequent processes. This is because, if a plurality of copies is printed in units of pages, the raster image on the m-th page acquired by a one-time RIP process is continuously printed a plurality of number of times, during which the rasterization of the page to be printed following the m-th page can be ended.

In step S412, the microprocessor unit 311 determines whether a recording paper on which printing needs to be performed at a lower speed is specified as a recording paper used for printing. If the microprocessor unit 311 determines that a recording paper on which printing needs to be performed at a lower speed is specified (YES in step S412), the processing proceeds to step S413. If the microprocessor unit 311 determines that a recording paper on which printing needs to be performed at a lower speed is not specified (NO in step S412), the processing proceeds to step S414.

The recording paper on which printing needs to be performed at a lower speed refers to a thick paper, for example, on which printing needs to be performed at a speed lower than a normal speed. A recording paper such as a thick paper deprives a fixing heater of more heat than a general recording paper in printing, so that the printing needs to be performed at a lower speed with the decreased speed of an engine. Furthermore, it takes time to raise the decreased temperature to the original one. For that reason, a longer printing interval needs to be provided, and printing is to be performed at a low speed.

The storage device 305 of the MFP 103 stores information indicating that which type of a recording paper is the one on which printing needs to be performed at a lower speed. The microprocessor unit 311 performs determination by comparing the information indicating that which type of stored PDL needs a recording paper on which printing needs to be performed at a lower speed with the information included in the print appearance specification portion 505 of the print job.

If the recording paper specified in the print job is specified as a recording paper to be printed at a low speed, the "RIP While Print" is determined as a printing method in the subsequent processes. This is because the RIP process on the page to be printed following the m-th page can be ended while printing on the m-th page is being performed at a low speed.

On the other hand, there has been an image forming apparatus (a media constant-speed apparatus) which performs printing on all types of recording paper without changing a processing speed. If a media constant-speed apparatus is used as the MFP 103, a printing interval and a printing speed do not change with the type of paper, so that printing is not always performed by the "RIP While Print." In step S413, the microprocessor unit 311 determines whether the MFP 103 is a media constant-speed apparatus.

If the microprocessor unit 311 determines that the MFP 103 is a media constant-speed apparatus (YES in step S413), the processing proceeds to step S414. If the microprocessor unit 311 determines that the MFP 103 is not a media constant-speed apparatus (NO in step S413), the processing proceeds to step S416.

In step S414, the microprocessor unit 311 determines whether a page on which monochrome printing is performed and a page on which color printing is performed are included in the print job. If the microprocessor unit 311 determines that a page on which monochrome printing is performed and a page on which color printing is performed are included in the print job (YES in step S414), the processing proceeds to step S416. If the microprocessor unit 311 determines that only any one of a page on which monochrome printing is performed and a page on which color printing is performed is included (NO in step S414), the processing proceeds to step S415. The microprocessor unit 311 performs determination with reference to the information included in the page information portion 503 of the acquired attribution information.

If a page on which monochrome printing is performed and a page on which color printing is performed are included in one print job, time is needed for process control for the temperature adjustment control of the fixing heater between monochrome and color pages, and the RIP process on the page to be printed next can be ended during the process control. For that reason, if a page on which monochrome printing is performed and a page on which color printing is performed are included in the print job, the "RIP While Print" is determined as a printing method in the subsequent process.

In step S415, the microprocessor unit 311 determines the printing method set as the model attributes in steps S402 and S403 as the printing method to be executed. More specifically, a printing method is determined according to whether the MFP 103 is equipped with the RIP accelerator 315 (whether the RIP process can be performed faster than normal).

If the MFP 103 is not equipped with the RIP accelerator 315, in other words, if the MFP 103 cannot perform the RIP process faster than normal, the "RIP Then Print" is determined as a printing method. On the other hand, if the MFP 103 is equipped with the RIP accelerator 315, in other words, if the MFP 103 can perform the RIP process faster than normal, the "RIP While Print" is determined as a printing method.

If it is not determined that the RIP process on the page to be printed following the m-th page can or cannot be finished while the print process on the m-th page included in the print job is being performed in the preceding steps and step S415, a printing method is determined in step S415.

In step S416, the microprocessor unit 311 determines the "RIP While Print" as a printing method. In step S417, the microprocessor unit 311 determines the "RIP Then Print" as a printing method. In step S418, the microprocessor unit 311 controls the MFP 103 so that the RIP process and the print process are performed by the printing method determined as the printing method to be executed.

In step S401, if the microprocessor unit 311 determines that the MFP 103 is equipped with the RIP accelerator 315, the determined printing method is sent from the microprocessor unit 311 to the RIP accelerator 315. The RIP process is performed in the RIP accelerator 315 and the print process is performed in the printer 303. In step S401, if the microprocessor unit 311 determines that the MFP 103 is not equipped with the RIP accelerator 315, the RIP process is performed by the microprocessor unit 311 and the print process is performed in the printer 303 according to the determined printing method.

Through the above process, the microprocessor unit 311 determines whether the RIP process on the page to be printed following the m-th page can be finished while the print process on the m-th page included in the print job is being performed under various conditions, and determines an appropriate printing method. This allows an appropriate switching between "RIP While Print" and the "RIP Then Print" to enable reducing time used for outputting a print result.

Although specific examples of the exemplary embodiments of the present invention are described above, the present invention is not limited to the above exemplary embodiment. The present invention can also be realized by executing the process described below. That is, software (programs) for realizing the functions of the above exemplary embodiment is supplied to a system or an apparatus via a network or various storage media, and the computer (or a CPU, a microprocessing unit (MPU), and/or the like) of the system or the apparatus reads and executes the program. In this case, the computer executable programs and the storage media storing the programs constitute the present invention.

It is obvious that the present invention is not limited to the exemplary embodiments, and various modifications and applications can be made within the scope of claims herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-094080 filed Apr. 15, 2010, which is hereby incorporated by reference herein in its entirety.

What is claimed is:

1. An image processing apparatus comprising:
an acquisition unit configured to acquire information, from a received print job, about an attribute of the print job;
a determination unit configured to determine which method is suitable as a printing method for the print job, a first printing method in which a print process is started before a raster image processing (RIP) process on all pages included in the print job is ended or a second printing method in which a print process is started after the RIP process on all pages included in the print job is ended, based on the attribute information acquired by the acquisition unit; and
a decision unit configured to decide the printing method determined as suitable for the print job by the determination unit as the printing method executed on the print job,
wherein the determination unit determines the first printing method as suitable for the print job if bookbinding print is not set in the print job and a type of page description language (PDL) included in the print job is not a type of PDL using process time longer than a predetermined process time at a time of the RIP process, and determines the second printing method as suitable for the print job if bookbinding print is set in the print job or the type of PDL included in the print job is a type of PDL using process time longer than a predetermined process time at the time of the RIP process.

2. The image processing apparatus according to claim 1, wherein the determination unit determines the first printing method as suitable for the print job if a transmission source of the print job has finished a bookbinding work even if the bookbinding print is set in the print job.

3. The image processing apparatus according to claim 1, wherein the determination unit determines the first printing method as suitable for the print job if a plurality of copies of the document included in the print job is printed in units of pages.

4. The image processing apparatus according to claim 1, wherein the determination unit determines the first printing method as suitable for the print job if a recording paper on which printing needs to be performed at a lower speed is specified as a recording paper used for the print process in the print job and the print process is performed not at a constant speed independently of a type of a recording paper.

5. The image processing apparatus according to claim 1, wherein the determination unit determines the first printing method as suitable for the print job if a page on which monochrome printing is performed and a page on which color printing is performed are included in the print job.

6. The image processing apparatus according to claim 1, further comprising a setting unit configured to set either of the first or second printing methods as a model attribute according to whether an image forming apparatus can perform the RIP process faster than normal,
wherein the decision unit decides the printing method set as the model attribute by the setting unit as the printing method executed on the print job if the determination unit has not determined which of the printing methods is suitable for the print job, and
wherein the setting unit sets the first printing method as a model attribute if the image forming apparatus can perform the RIP process faster than normal, and sets the second printing method as a model attribute if the image forming apparatus cannot perform the RIP process faster than normal.

7. An image processing method comprising:
acquiring information about an attribute of a print job from the received print job;
determining which method is suitable as a printing method for the print job, a first printing method in which a print process is started before a raster image processing (RIP) process on all pages included in the print job is ended or a second printing method in which a print process is started after the RIP process on all pages included in the print job is ended, based on the attribute information acquired by the acquisition unit; and
deciding the printing method determined as suitable for the print job as the printing method executed on the print job, wherein the first printing method is determined as suitable for the print job if bookbinding print is not set in the print job and a type of page description language (PDL) included in the print job is not a type of PDL using process time longer than a predetermined process time at the time of the RIP process, and the second printing method is determined as suitable for the print job if bookbinding print is set in the print job or the type of PDL included in the print job is a type of PDL using process time longer than a predetermined process time at the time of the RIP process.

8. The image processing method according to claim 7, wherein the first printing method is determined as suitable for the print job if the transmission source of the print job has finished a bookbinding work even if the bookbinding print is set in the print job.

9. The image processing method according to claim 7, wherein the first printing method is determined as suitable for the print job if a plurality of copies of the document included in the print job is printed in units of pages.

10. The image processing method according to claim 7, wherein the first printing method is determined as suitable for the print job if a recording paper on which printing needs to be performed at a lower speed is specified as a recording paper to be used for the print process in the print job and the print process is performed not at a constant speed independently of a type of a recording paper.

11. The image processing method according to claim 7, wherein the first printing method determined as suitable for the print job if a page on which monochrome printing is performed and a page on which color printing is performed are included in the print job.

12. The image processing method according to claim 7, further comprising:

setting either one of the first or second printing methods as a model attribute according to whether an image forming apparatus can perform the RIP process faster than normal, wherein the printing method is decided so as to set the model attribute as the printing method executed on the print job if which of the printing methods is suitable for the print job is not determined, and the first printing method is set as a model attribute if the image forming apparatus can perform the RIP process faster than normal, and the second printing method is set as a model attribute if the image forming apparatus cannot perform the RIP process faster than normal.

13. A non-transitory computer-readable storage medium storing a program that can cause a computer to execute the method according to claim 7.

* * * * *